United States Patent
Shen et al.

(10) Patent No.: US 8,234,950 B1
(45) Date of Patent: Aug. 7, 2012

(54) HOMOGENEOUS AND SINGLE-SIDE-OPERATIONAL CONNECTOR MECHANISM FOR SELF-RECONFIGURABLE, SELF-ASSEMBLY AND SELF-HEALING SYSTEMS

(75) Inventors: Wei-Min Shen, Rancho Palos Verdes, CA (US); Robert M. Kovac, Simi Valley, CA (US)

(73) Assignee: University of Southern California, Los Angeles, CA (US)

( * ) Notice: Subject to any disclaimer, the term of this patent is extended or adjusted under 35 U.S.C. 154(b) by 633 days.

(21) Appl. No.: 12/368,292

(22) Filed: Feb. 9, 2009

Related U.S. Application Data

(60) Provisional application No. 61/065,046, filed on Feb. 8, 2008.

(51) Int. Cl.
  *B25J 17/00* (2006.01)
(52) U.S. Cl. ...... 74/490.05; 901/28
(58) Field of Classification Search ......... 74/490.01, 74/490.02, 490.05; 901/15, 28
  See application file for complete search history.

(56) References Cited

U.S. PATENT DOCUMENTS

| | | | | |
|---|---|---|---|---|
| 5,428,713 | A * | 6/1995 | Matsumaru | 700/245 |
| 6,636,781 | B1 | 10/2003 | Shen et al. | |
| 7,013,750 | B1 * | 3/2006 | Kazami | 74/490.05 |
| 7,444,205 | B2 * | 10/2008 | Desmond | 700/245 |

OTHER PUBLICATIONS

Shen, Wei-Min, "Self-Reconfigurable Robots for Adaptive and Multifunctional Tasks," Proceedings of the 26th Army Science Conference, Florida, USA, Dec. 2008, 8 pages.

Rubenstein, M. and Wei-Min Shen, "A Scalable and Distributed Model for Self-organization and Self-healing," In Proc. 2008 Intl. Conf. on Autonomous Agents and Multiagent Systems, Estoril, Portugal, May 2008, 5 pages.

Shen, W.-M., "Rolling and Climbing by the Multifunctional SuperBot Reconfigurable Robotic System," AIP Conference Proceedings No. 969, Space Technology and Applications International Forum—STAIF 2008, M.S. El-Genk (Ed.), Feb. 10-14, 2008, Albuquerque, New Mexico, pp. 839-848 (2008).

* cited by examiner

*Primary Examiner* — Thomas R Hannon
*Assistant Examiner* — Phillip A Johnson
(74) *Attorney, Agent, or Firm* — Fish & Richardson P.C.

(57) ABSTRACT

Designs of single-end-operative reconfigurable genderless connectors that include a base, a plurality of movable jaws that are formed on the base and can engage to the jaws of another connector, and an actuator that is mounted on the base and can engage and move the jaws of the reconfigurable connector to connect the reconfigurable connector with another connector.

18 Claims, 12 Drawing Sheets

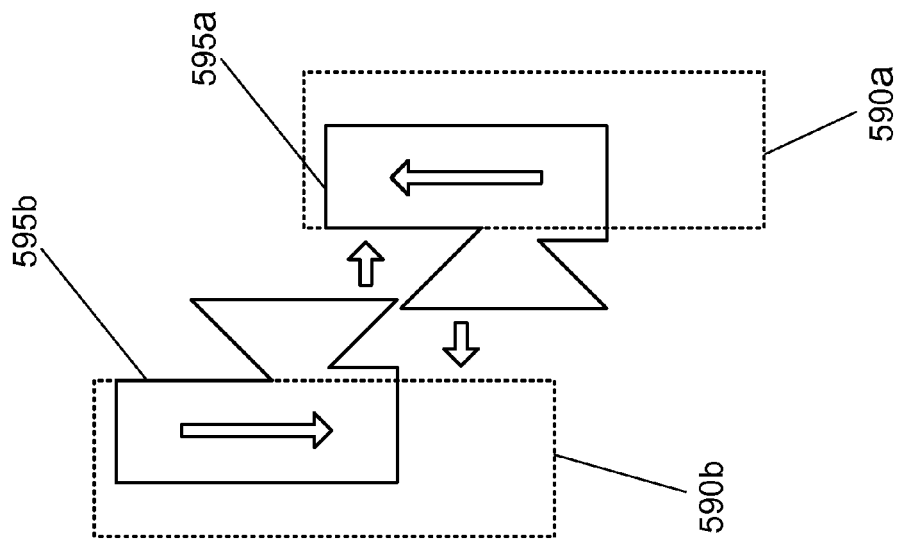
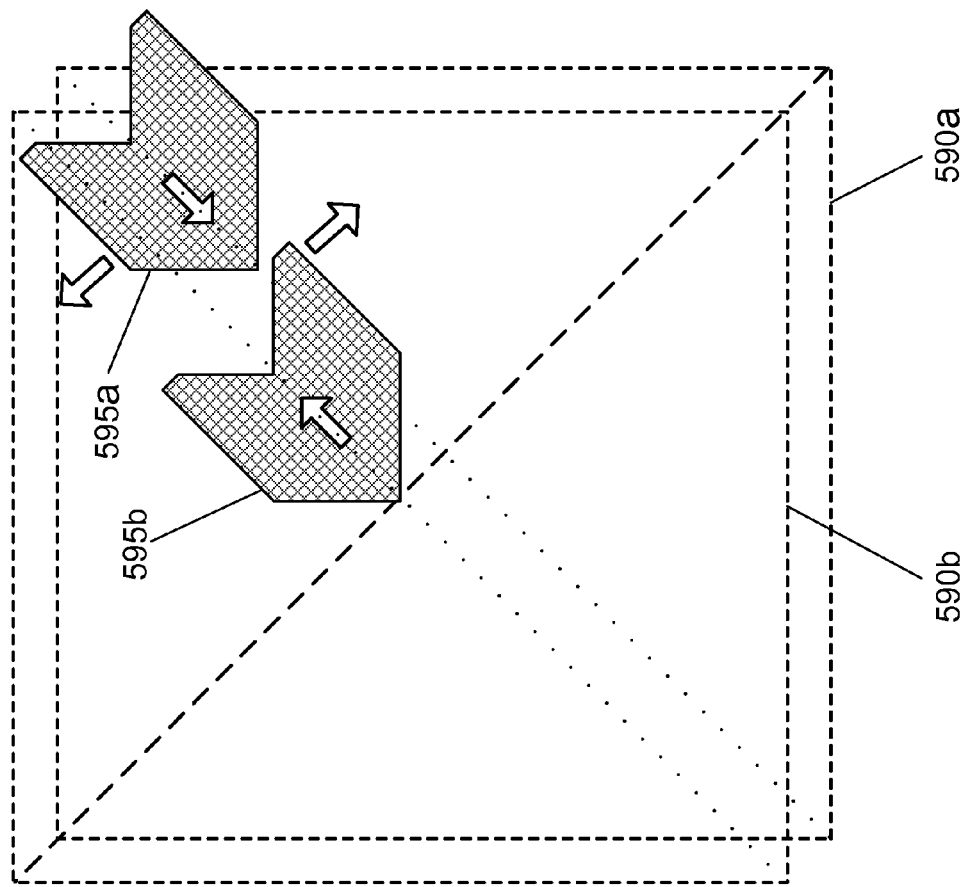

HOMOGENEOUS AND SINGLE-SIDE-OPERATIONAL CONNECTOR MECHANISM FOR SELF-RECONFIGURABLE, SELF-ASSEMBLY AND SELF-HEALING SYSTEMS

CROSS REFERENCE TO RELATED APPLICATIONS

This document claims priority under 35 U.S.C. §119(e) to U.S. Provisional Application Ser. No. 61/065,046, entitled "Homogeneous And Single-Side-Operational Connector Mechanism For Self-Reconfigurable, Self-Assembly And Self-Healing Systems," and filed by Wei-Min Shen et al. on Feb. 8, 2008, the entire disclosure of which is incorporated herein by reference.

FEDERALLY SPONSORED RESEARCH OR DEVELOPMENT

The research and development for inventions described in this document received funding under NASA Grant No. NNA05CS38A from the National Aeronautics and Space Administration. The U.S. Government may have rights to various technical features described in this document.

TECHNICAL FIELD

This document relates to reconfigurable connectors and their applications.

BACKGROUND

There exist many connection mechanisms. However, most do not yet support single-end-operations. For example, connections using permanent magnets, electromagnetic force, or electrostatic force may lose a connection unintentionally if one end is out of service. Connections using physical latches and pins are mostly gendered and may be stuck permanently if one side is to malfunction.

SUMMARY

Flexible and reliable connection can be used for self-reconfiguration, self-assembly, and/or self-healing. Some designs for such connection mechanisms suffer from a deficiency that a connection would seize itself if one end malfunctions or is out of service. This document describes examples of connectors that can establish or disengage a connection even if one end of the connection is not operational. The connectors described are genderless and can change the state of a connection from either end so as to provide single-end-operations. The connectors may offer the desired properties for flexibility, endurance, strength, and efficiency. Designs of single-end-operative reconfigurable genderless connectors described here can include a base, a plurality of movable jaws that are formed on the base and can engage to the jaws of another connector, and an actuator that is mounted on the base and can engage and move the jaws of the reconfigurable connector to connect the reconfigurable connector with another connector.

In one aspect, a reconfigurable connector is disclosed that can include a base; two or more movable jaws that are disposed on the base and configured to engage or disengage the jaws of another connector to establish or break a connection between the reconfigurable connector and the other connector; and an actuator that is attached to the base and configured to engage and drive the jaws of the reconfigurable connector to connect or disconnect the reconfigurable connector with the other connector. The reconfigurable connector can establish or break the connection between the reconfigurable connector and the other connector regardless of whether the other connector is operational or whether the other connector has a female or male configuration.

In another aspect, a reconfigurable connector is disclosed that can include a base; two or more movable jaws that are disposed on the base and movable along a plurality of predetermined paths on the base respectively where the jaws are capable of engaging or disengaging two or more jaws of another identical connector when the jaws of the reconfigurable connector move in either direction along the predetermined paths respectively; and an actuator that is attached to the base and configured to engage and move the jaws of the reconfigurable connector in synchronization to connect or disconnect the reconfigurable connector with another identical connector.

In some embodiments, the reconfigurable connector can include four jaws that are movably engaged in four liner sliding rails respectively so that each jaw can move along its respective sliding rail. The four sliding rails may be formed in a cross configuration to meet at a center location of the base.

In some embodiments, the reconfigurable connector can engage to the other connector when the four jaws of the reconfigurable connector move towards the center location of the base. In some embodiments, the reconfigurable connector can engage to the other connector when the four jaws move away from the center location. In some embodiments, the reconfigurable connector can engage to the other connector when the fours jaws move about halfway of the sliding rails.

In some embodiments, the actuator of the reconfigurable connector can include a motorized circular gear that has concentric gear tracks to engage to the four jaws of the reconfigurable connector.

In some embodiments, the reconfigurable connector can also include a device that communicates with another identical connector to be engaged to guide docking alignment between the two connectors. In some embodiments, the communicating device can also include a sensor that can signal for docking guidance. In some embodiments, the communicating device can further include a controller that has a guidance algorithm for docking process. In some embodiments, the sensor can sense the position of the jaws, as well as the proper engagement of the jaws when connected to the jaws of some other connectors.

In some embodiments, the jaws of the reconfigurable connector are shaped and arranged such that during engagement the reconfigurable connector and the other connector can automatically align with each other in longitude, latitude, separation, pitch, yaw or roll dimensions.

In another aspect, a robotic system is disclosed that can include two or more robotic modules; and two or more reconfigurable connectors described above where at least two of the robotic modules are connected by two of the reconfigurable connectors.

In a further aspect, a device is disclosed that can include two or more reconfigurable connectors as described above where the reconfigurable connectors are engaged to one another to form a chain.

The connectors described herein are genderless (homogeneous) and can be configured to realize desirable features such as strong and accurate mechanical linkage, long endurance, thin profile, compliant for misalignment, power efficiency, communication, docking guidance, and potentially offers power sharing and reliability in rough environments.

For recoverability, the connectors can disconnect even if the other side is damaged. For self-assembly, the connector can connect to another connector even if that connector is not operational. One feature of the connectors is the ability to reconfigure the connections between components and to autonomously join and disjoin components at will.

DESCRIPTION OF DRAWINGS

FIGS. 5A-5B show how the shape of connector jaws may contribute to automatic alignment in longitude-latitude and separation dimension during the engagement process.

Like reference symbols in the various drawings indicate like elements.

DETAILED DESCRIPTION

Figure 1A:
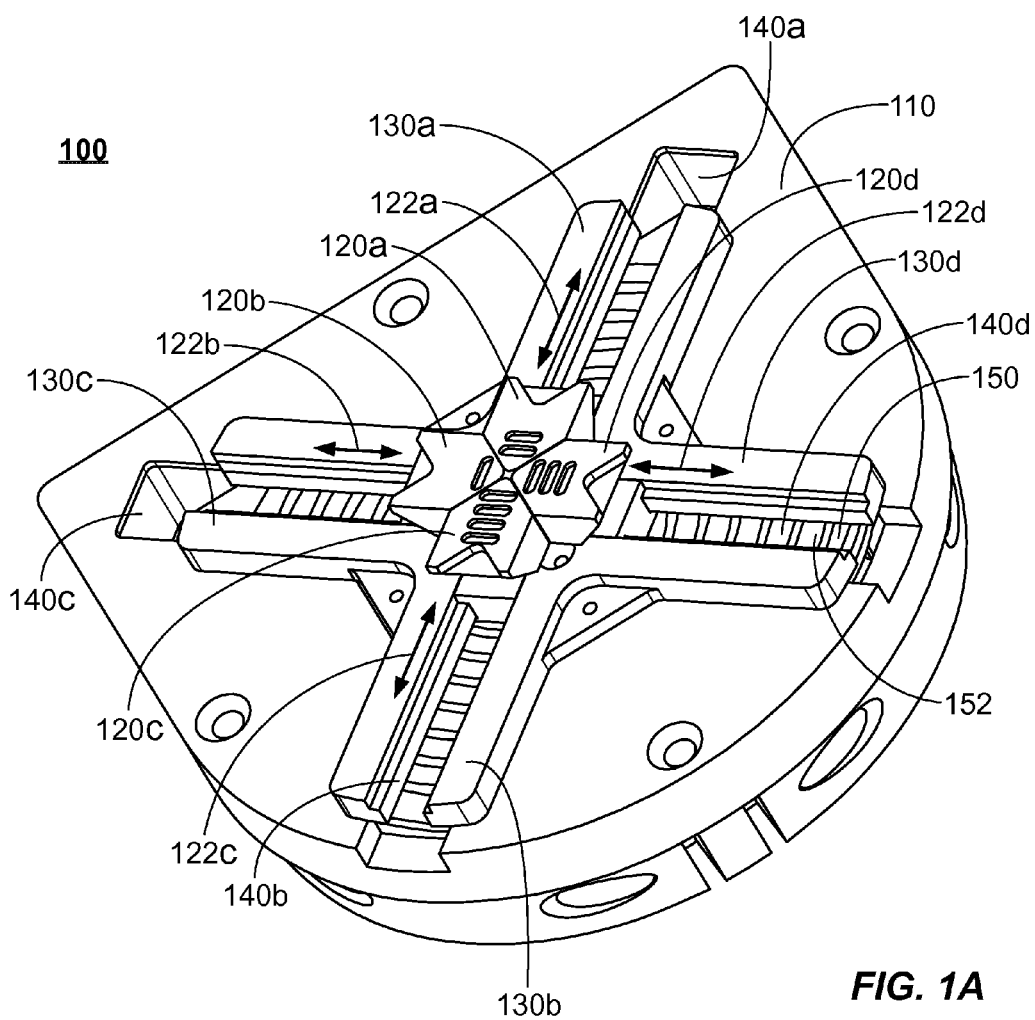
FIGS. 1A-1D show various views of one example of a genderless single-end releasable reconfigurable connector.

This document describes a connector suitable for self-reconfigurable and self-healing systems. The unique features of the connector described may include the genderless (homogeneous) structure, strong and accurate mechanical linkage, long endurance, thin profile, compliant for misalignment, power efficient, supporting communication, docking guidance, and the possibility for sharing power. The connector can be seamlessly integrated with an existing self-reconfigurable robot, and can perform the desired compliance, speed, accuracy, flexibility, efficiency, and endurance. These features enable this connection mechanism to be useful in many real-world applications. In some implementations, the connector can be so designed as to endure dirt and become waterproof in rough environments.

A flexible and reliable connection mechanism can be used to realize the full potential of self-reconfigurable, self-assembling, and self-healing systems. Such a mechanism can be configured to enable the elements in a system to physically connect and reconnect to form different configurations, shapes, and assemblies. Applications may include, among others, self-assembly in space or underwater, self-reconfigurable robotic systems for multifunctional applications, reconfigurable and flexible manufacturing, reconfigurable tools/devices for dynamic situations.

One consideration for such connection mechanisms is that they should be single-end-operative, that is, able to establish or disengage a connection even if one end of the connection is not operational. This feature can be advantageous because components in a system may be unexpectedly damaged or deliberately taken out of service, yet the process of self-organization preferably should go on. In other words, it is desirable that no connections be seized permanently or disconnect unintentionally.

Another consideration is the flexibility of the connection mechanism and whether it will allow any two components to connect. In a self-reconfigurable system, there is a balance between having homogeneous components (for lower cost) and heterogeneous functions (for more applications). At one extreme, all components may have homogeneous structures and functions but the system is over-redundant and inefficient. At the other extreme, all components may be unique and special but such a system is subject to single point failures. The connectors described herein may balance between the two extremes by having homogeneous robotic skeleton "bone" modules to connect heterogeneous devices, such as special sensors, actuators, power suppliers, tools, and protective shields. A reconfigurable genderless connector, such as the exemplary connector illustrated in FIGS. 1A-1D, may allow any two components to connect without gender restrictions imposed by their connectors and may allow one connector to connect to another connector even if that connector is not active.

Reconfigurable connectors are connectors that can change their configurations to change their connections with other connectors. A reconfigurable connector can be motorized by one or more motor actuators to adjust its connection configuration. One of the applications of a reconfigurable connector is self-reconfigurable robotic modules and systems to make connections with other modules in 3D configurations (e.g., front, back, left, right, up, and down).

FIGS. 1A-1D show an exemplary embodiment of a single-end-operative and genderless connector for self-reconfiguration, self-assembly and self-healing. The connector 100 has a connector base 110 on which four movable connector jaws 120$a$-$d$ are formed on one side to provide the single-end releasable connection operation. Four linear connector sliding rails 130$a$-$d$ are formed in a symmetric cross configuration and meet at a center location (similar to a chuck). The connector jaws 120$a$-$d$ are movably engaged in the connector sliding rails 130$a$-$d$, respectively so that each connector jaw can move along its respective connector sliding rail in directions 122$a$-$d$. In operation, the connector jaws 120$a$-$d$ can move towards the center to engage to another connector and away from the center to disengage or vice versa depending on which two connectors are engaged to each other. The connector jaws 120$a$-$d$ are shaped to engage to corresponding connector jaws of another such connector either in the central area within corresponding connector jaws of another such connector or outside the corresponding connector jaws of another such connector. To connect two such connectors, the four connector jaws on one connector are engaged to the four connector jaws of another connector to form a solid connection. To release, the four connector jaws on one connector are driven to be closed or open to disengage with the other connector. The shape of the jaw can be so designed as to offer compliance during connector engaging and disengaging.

Figure 1B:
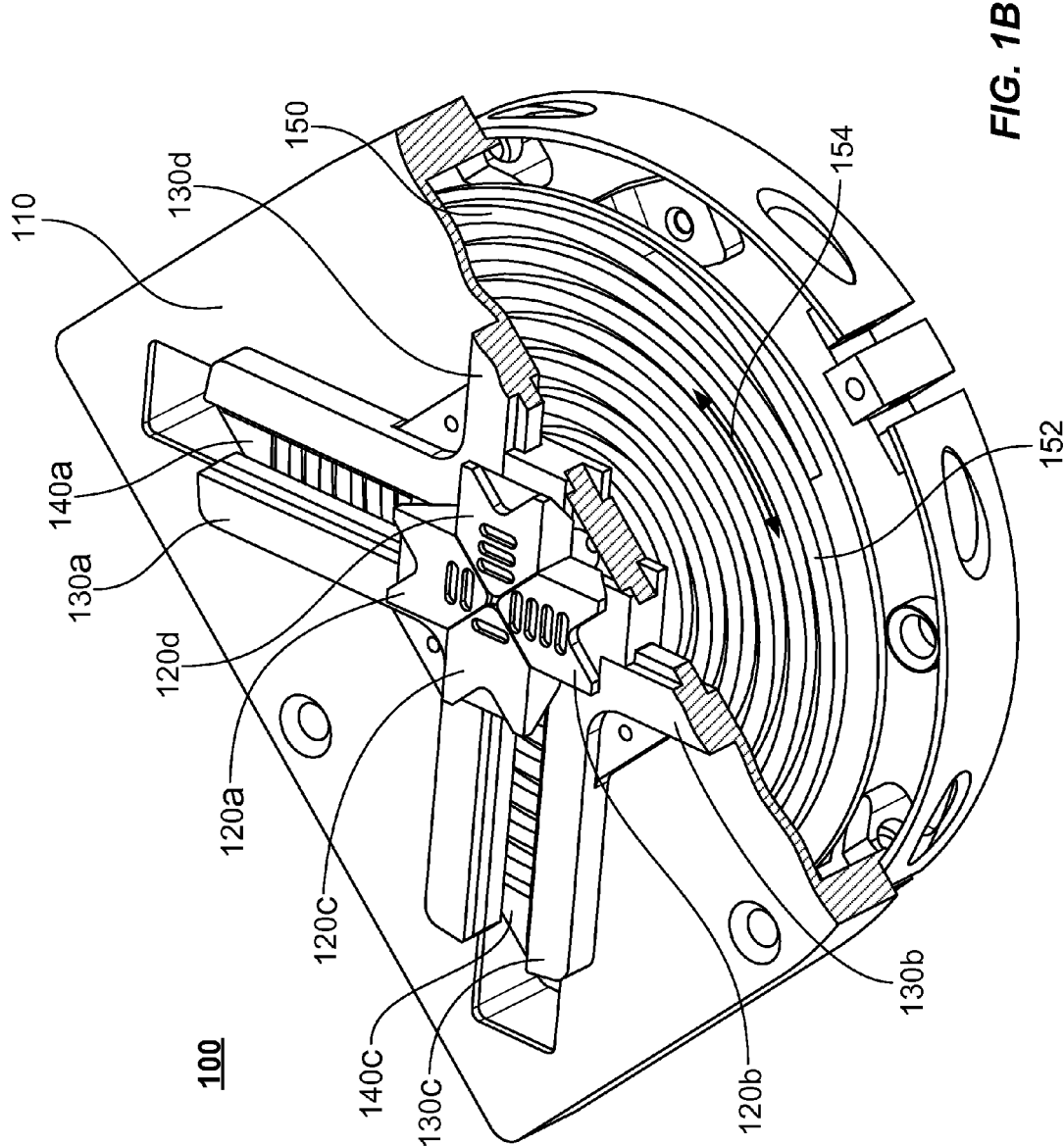

FIGS. 1A-1B show that the connector base 110 is structured to have four open slots 140$a$-$d$ that are under the sliding rails 130$a$-$d$, respectively, to expose a motorized circular gear 150 mounted on the other side of the connector base 110 that is engaged to the connector jaws 120$a$-$d$ and drives the connector jaws 120$a$-$d$ along their sliding rails 130$a$-$d$, respectively. The motorized circular gear 150 has top spiral or concentric gear tracks 152 that are engaged to the bottoms of the connector jaws 120$a$-$d$. As the motorized circular gear 150 rotates, the connector jaws 120$a$-$d$ move along the radial direction of the motorized circular gear 150 along their respective sliding rails 130$a$-$d$, respectively. Depending on the direction of the rotation 154 of the motorized circular gear 150, the connector jaws 120$a$-$d$ can move either towards the center to be close to one another or away from the center to be apart from one another. Because the connector jaws 120$a$-$d$ are driven by the common motorized circular gear 150, the connector jaws 120*a-d* are move in synchronization with one another. The entire mechanism is drivable by a single micro motor and thus is energy efficient.

When two connectors are connected, the jaws on both sides can be designed and operated to meet at the halfway of the rail to establish the connection. This can ensure that any one side of this connection could release itself even if the other partner is inactive. To release from such an established connection, the active side will close its jaws all the way to the center if they are inside the jaws of the partner, or open its jaws all the way to the edge if they are outside the jaws of the partner. These movements may allow the active side to disengage its jaws from the partner and release itself from the connection. To enter this desired state, the connectors may communicate during the docking process and decide which side is moving inwards and which side outwards.

Figure 1C:
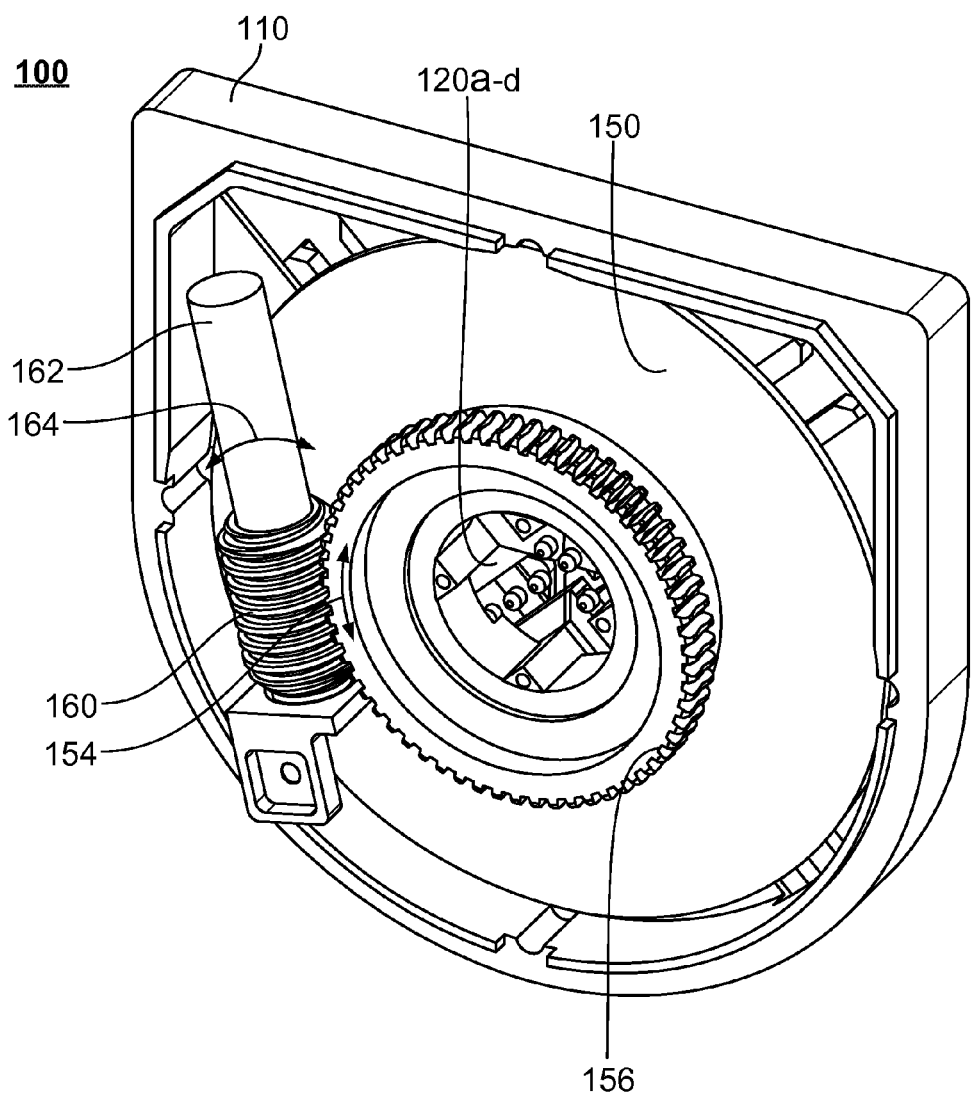
Figure 1D:
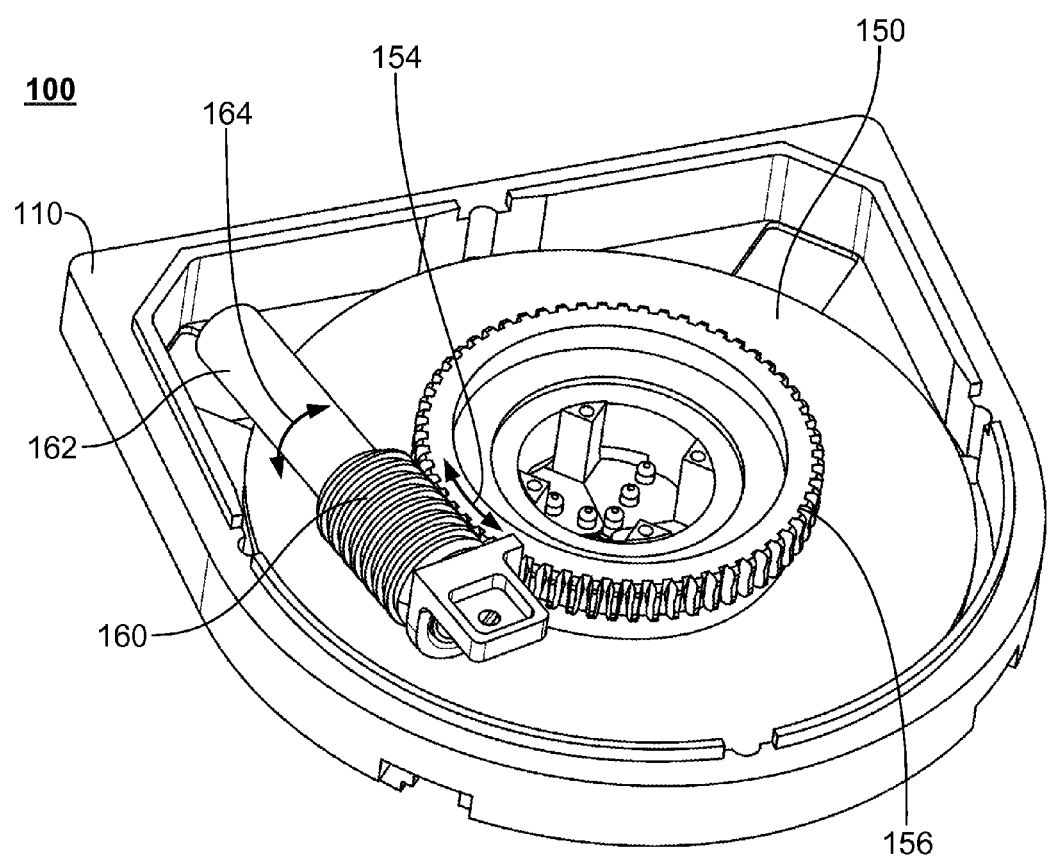

FIGS. 1C-1D show the back side of the connector interior to illustrate the drive train for the motorized circular gear 150. The bottom side of the motorized circular gear 150 has a bottom circular drive gear 156 that is concentric with the motorized circular gear 150 and has a diameter less than the motorized circular gear 150. The bottom circular drive gear 156 is engaged to a motor linear gear 160 and rotates as the motor linear gear 160 spins around its shaft 162 along the direction of shaft rotation 164. The motorized circular gear 150 rotates in synchronization with the bottom circular drive gear 156.

A connector designed based on the teachings of this document is genderless or homogeneous because it is not in the convention female or male connector configurations and can be configured to include the following features: strong mechanical endurance, power sharing, communication, guidance, and reliability in rough environments. Connectors designed based on the teachings of this document can provide strong and accurate mechanical linkages between modules as well as the linkage for communication and power sharing. For recoverability, a connector designed based on the teachings of this document can disconnect even if the module on one side is damaged. One notable feature of the present design is the ability to reconfigure the connections between components and to autonomously join and disjoin components at will.

The connector as illustrated in FIGS. 1A-1D has the advantage of being strong once a connection is established. Since the connector jaws are driven by a motorized circular gear along their respective sliding rails, there is no backslash in their movement and position. This feature can enhance the strength of the connector. One deciding factor is the material of the jaws. As long as the jaws are not broken or chipped, the connection can endure its load. For example, when a plastic-like material is used for the prototype, the connector can lift at least two other robotic modules ("SuperBot" modules) of about 2.5 kg without any sign of breaking. The strength of the connector may increase considerably if the jaws are made of high-strength materials, such as metals.

The robotic module "SuperBot" is a self-reconfigurable robot built at USC/ISI Polymorphic Robotic Laboratory that can adapt its shape, size, and configuration to unexpected situations and tasks. SuperBot can operate in different modes of locomotion, such as slither, crawl, walk, run, roll, climb, dig, bury, swim, fly, hover, and different tasks, such as delivering payloads, gathering data, and the like.

SuperBot uses a hormone-inspired distributed control for its diverse behaviors in locomotion, manipulation, self-reconfiguration and self-healing. The approach is inspired by the biological concept of hormones (thus the name digital hormones) and it provides a unified solution for metamorphic systems self-reconfiguration, self-assembly, locomotion, and manipulation. Examples of a formalized control method based on this principle are descried in U.S. Pat. No. 6,636,781 entitled "Distributed control and coordination of autonomous agents in a dynamic, reconfigurable system," the entire disclosure of which is incorporated herein by reference. SuperBot is made of many autonomous, intelligent, and self configurable (software or hardware) modules. The Modules are modeled as autonomous agents free from globally unique identifiers and they can physically connect and disconnect with each other and can communicate via content-based messages. In particular, the totally distributed method can support a general representation for self-reconfigurable systems, and provide distributed solutions for task negotiation, topology-dependent behavior selection and synchronization, detection and reaction for topology changes and message loss, endure configuration damage such as bifurcation, unification, loss of modules, and other shape alternations. The modules in the robot will autonomously change their behavior based on their locations in the current function. This type of topology-triggered behaviors can enable adaptation and self-healing.

Figure 2:
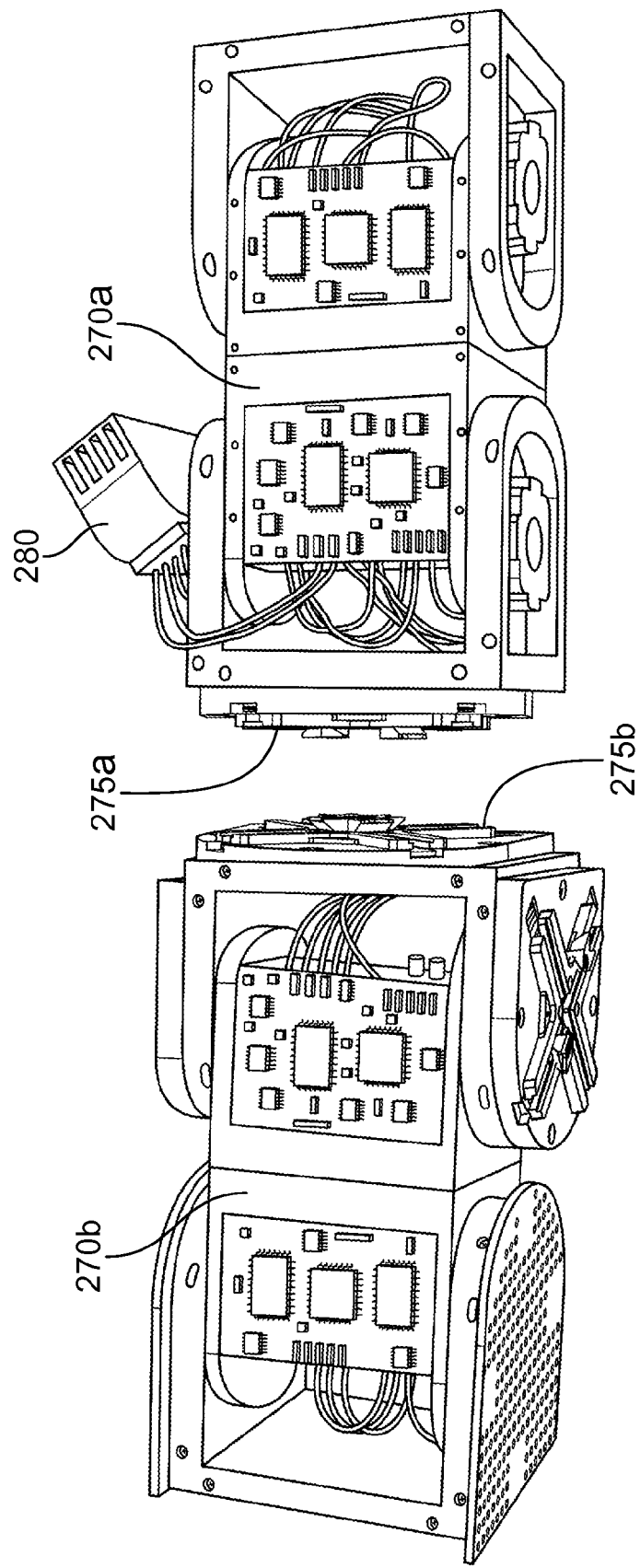
FIG. 2 shows an experiment for single-end-operation or self-healing.

To demonstrate the ability for single-end-operation, two SuperBot modules were connected using two connectors of FIGS. 1A-1D. As shown in FIG. 2, SuperBot module 270*a* has a connector 275*a* at one end and SuperBot module 270*b* also has a connector 275*b* at one end where the connectors 275*a-b* face to each other for engagement. Module 270*a* was powered with a motor 280 while module 270*b* was not. The powered module 270*a* could first dock with, and then de-dock from the un-powered module 270*b*. The power was then switched from module 270*a* to module 270*b*, and repeat the dock and de-dock process. In these experiments, the jaws of the connectors are engaged at the halfway of the sliding rails to establish a connection. The operations are successful for four possible combinations of the single-end-operations, i.e., module 270*a* is engaging and module 270*b* is dead; module 270*a* is disengaging and module 270*b* is dead; module 270*a* is dead and module 270*b* is engaging; and module 270*a* is dead and module 270*b* is disengaging.

A connector designed based on teachings of this document can be used in self-reconfigurable robotic modules to make connections with other modules in 3D configurations (e.g., front, back, left, right, up, and down). Applications for such connector include, among others, self-assembly in space or underwater, self-reconfigurable robotic systems for multi-functional applications, reconfigurable and flexible manufacture, reconfigurable tools/devices for dynamic situations.

Figure 3A:
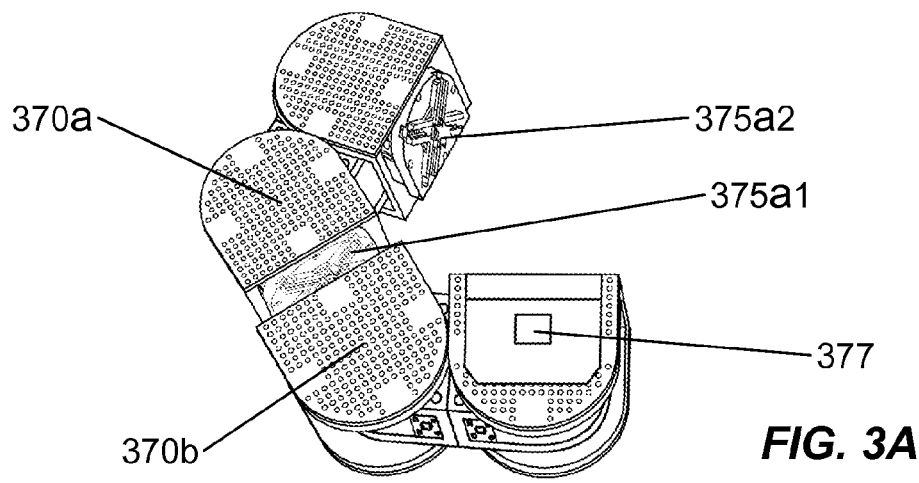
FIGS. 3A-3F show self-configuration with robotic "Super-Bot" modules.
Figure 3B:
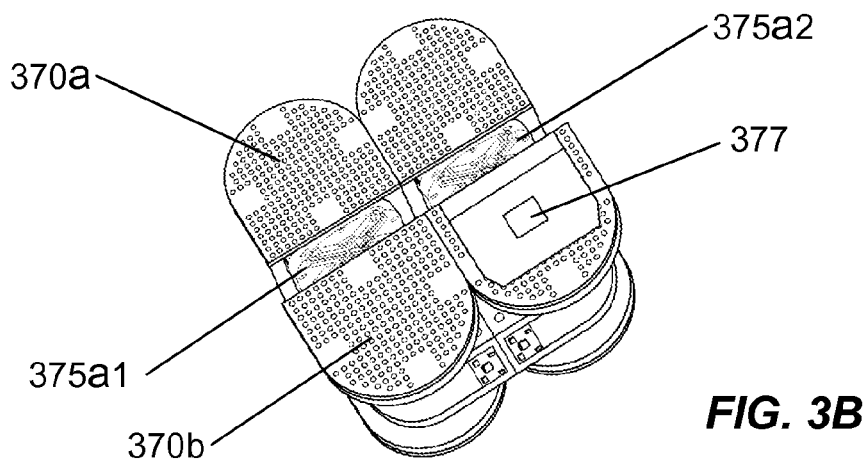
Figure 3C:
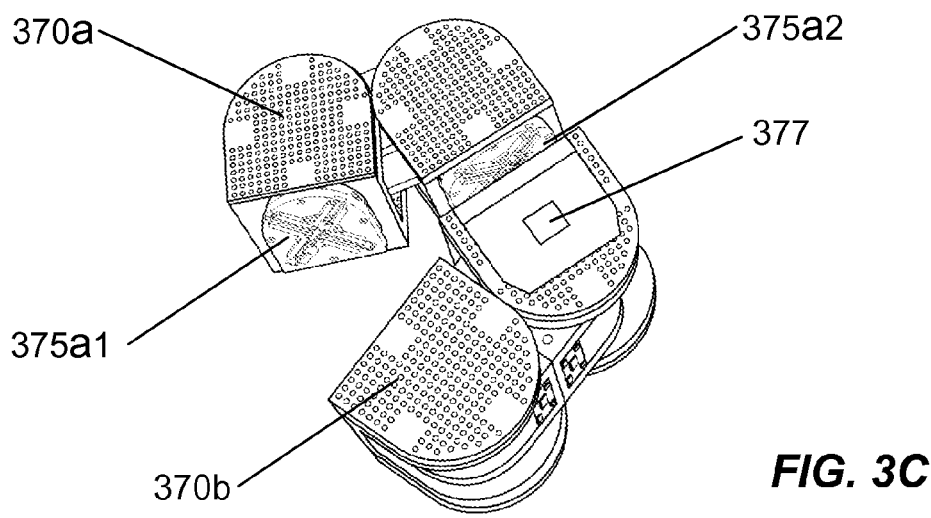
Figure 3D:
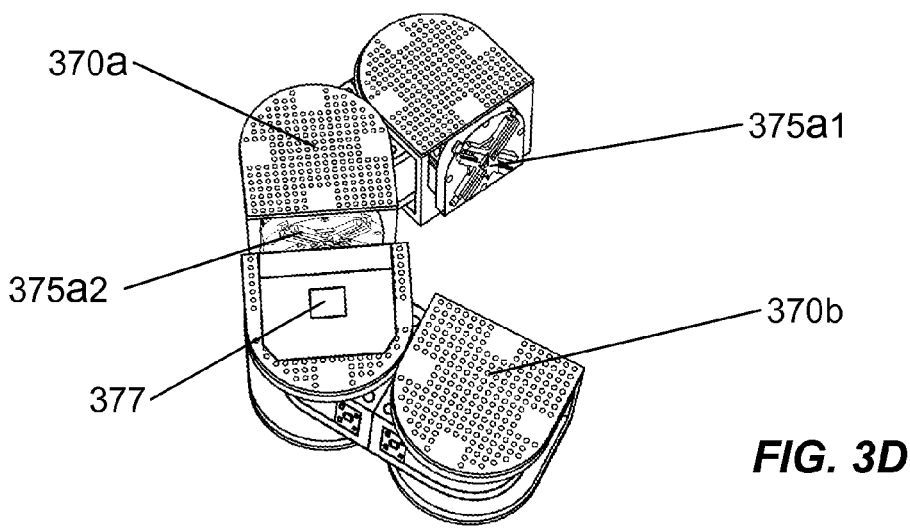
Figure 3E:
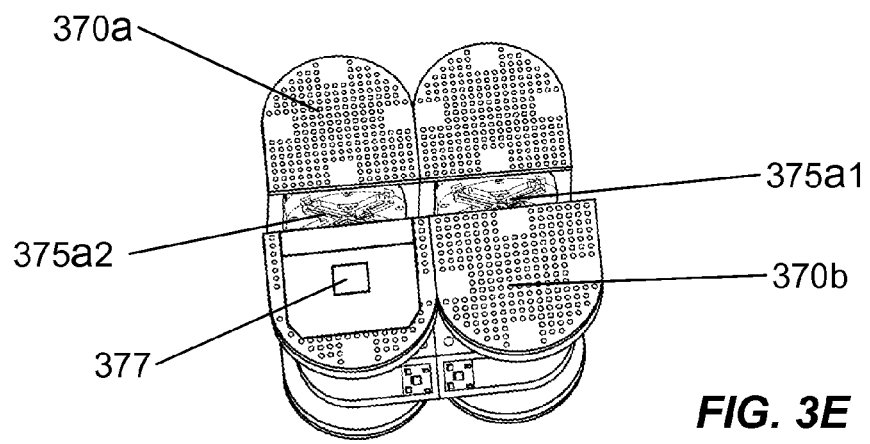
Figure 3F:
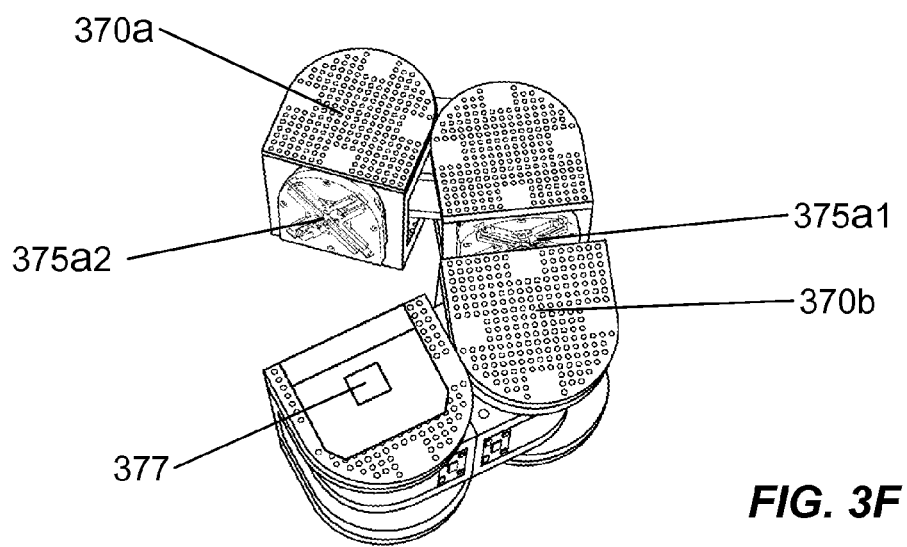

To demonstrate the self-reconfigurability, a chain configuration was constructed using two SuperBot modules with two pairs of connectors illustrated in FIGS. 1A-1D and programmed to change its configurations autonomously. FIG. 3 shows the sequence of such self-reconfiguration. The initial configuration (FIG. 3A) is a chain of two SuperBot modules 370*a-b* connected by a first pair of connectors in the middle. One connector of the first connector pair is connector 375*a*1 attached to one end of module 370*a* and the other connector (not shown) is attached to one end of module 370*b*. The first pair of connectors are engaged to each other in this configuration. This configuration has a second pair of connectors at both ends. One connector of the second pair is connector 375*a*2 attached to the other end of module 370*a* and the other connector (not shown) is attached to the other end of module 370*b*. The second pair of connectors are separate from each other in this configuration. To make the configuration visually distinguishable, one end of the chain was marked with a yellow sign 377. The chain first bent its two ends together and docked the second pair of connectors to form a closed loop (FIG. 3B). The chain then disconnected the initial (middle)

connection of the first pair of connectors and by doing so the chain formed a new configuration with the yellow sign 377 in the middle (FIG. 3C). The chain then bent its two newly formed ends and docked these two ends to form a new loop by engaging again the first pair of connectors with each other (FIGS. 3D and 3E), and then disconnected the middle connection and morphed back to the initial chain configuration (FIG. 3F). This sequence shows that the connectors as shown in FIGS. 1A-1D can be completely integrated with the Super-Bot and can align, establish, and disengage connections in a self-reconfigurable robotic system.

To provide the guidance for docking alignment, a connector designed based on the teachings of this document can use either Infrared LEDs or laser signals for both docking guidance and communication between neighboring modules. The communication devices will be arranged in such a way that when two such connectors are aligned they will have the maximal signal receptions. Guidance algorithms can be developed for the docking process, including both alignment and the control of relative motions between the two docking connectors. To protect the connectors while the robot is walking on rough terrain, this new design can hold a protective shield to prevent the open connectors from directly touching the ground. This mechanism can dock to the feet connectors as reconfigurable "walking shoes."

During the docking process, if two sides are both active, then they can enter the desired state by communicating and negotiating which side is moving inwards and which side outwards. If only one side is active, then it can sense (e.g., via a camera) the state of the inactive partner (i.e., the positions of the jaws), and then decide how to move its own jaws (i.e., inward or outward) when approaching to dock.

One consideration for any connection mechanism for self-reconfiguration, self-healing and self-assembly is compliance for autonomous docking. During reconfiguration, connectors approach to and align with each other before establishing the connection. However, due to the uncertainties in sensing and control and the disturbance from the environment, alignment may not be perfect. Thus, a connector should preferably be able to tolerate these uncertainties when establishing the connection. The more a connector is tolerant to misalignment, the better it is for autonomous docking.

The connectors described herein are designed so as to have sufficient compliance in the six dimension of the alignment, including longitude, latitude, separation, pitch, yaw, and roll. These situations are illustrated in FIGS. 4A-4D.

Figure 4A:
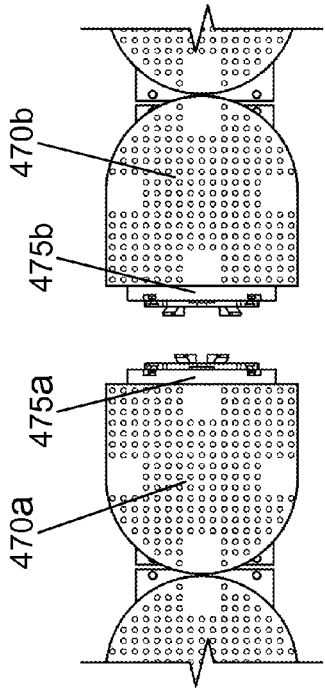
FIGS. 4A-4D show the six compliance dimensions (longitude, latitude, separation, pitch, yaw and roll) during autonomous docking.

FIG. 4A shows two SuperBot modules 470a-b. Module 470a has a connector 475a at one of its ends and module 470b has another connector 475b at one of its ends. Modules 470a-b are positioned on the same level with the two connectors 475a-b facing towards each other where modules 470a-b can engage to each other along the longitude and/or latitude dimension of their position level. The longitude and latitude dimensions are equivalent to the x and y dimensions in a Cartesian coordinate system.

Figure 4C:
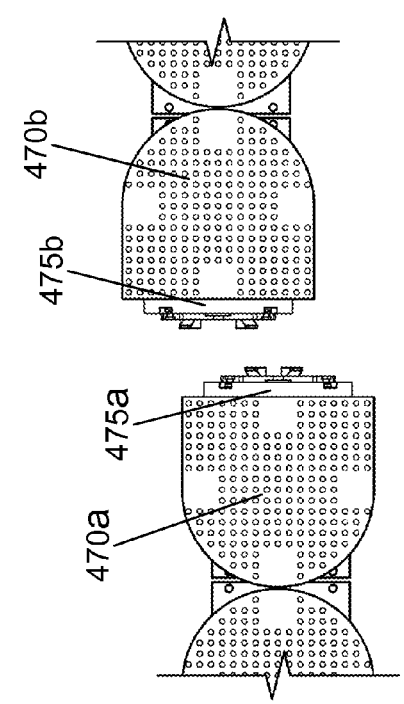
Figure 4B:
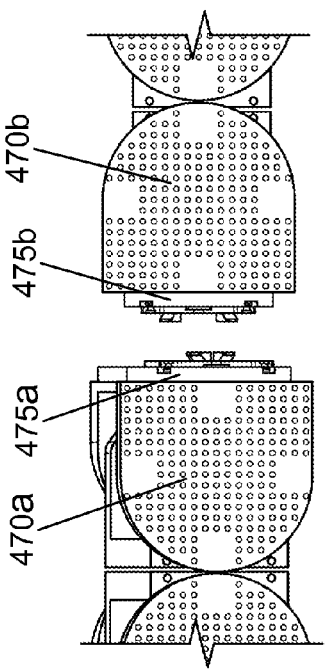

FIG. 4B also shows two SuperBot modules 470a-b, each with a connector at one of its end. Connector 475a is attached to module 470a and connector 475b is attached to module 470b. Modules 470a-b are positioned on different levels with the two connectors 475a-b facing towards each other. At this configuration, modules 470a-b can engage to each other along the separation dimension of the different module levels. The separation dimension is equivalent to the z dimension in a Cartesian coordinate system.

FIG. 4C also shows two SuperBot modules 470a-b with two connectors 475a-b facing towards each other and separately attached to their respective module. Module 470a-b are positioned at the same level but with an angle where modules 470a-b can engage to each other in the pitch and/or yaw dimension. The pitch and yaw dimensions are the $\psi$ and $\theta$ dimensions in a spherical coordinate system.

Figure 4D:
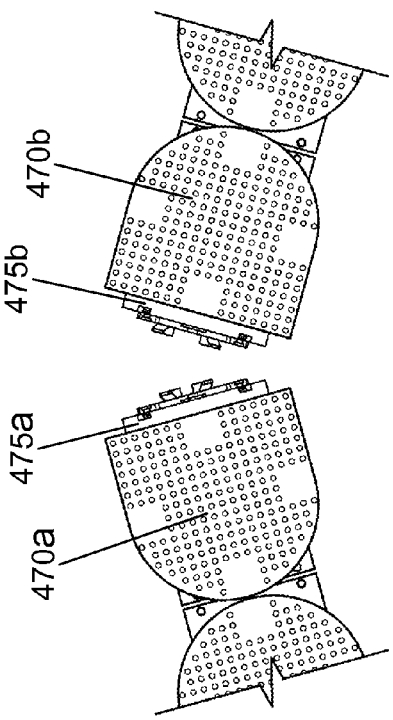

FIG. 4D also shows two SuperBot modules 470a-b that are aligned along their centerlines. Module 470a has a connector 475a at one of its ends and module 470b has another connector at one of its ends. The two connectors 475a-b face towards each other which allows modules 470a-b engage to each other in the roll dimension. The roll dimension is the r dimension in a spherical coordinate system.

The compliance of the connectors mainly comes from two factors: (1) the shape of the connector jaws, and (2) the arrangement of the connector jaws. To illustrate how the shape of connector jaws may contribute to the compliance, FIGS. 5A and 5B show the cross-sectional view and side view of the jaws during engagement. In FIGS. 5A and 5B, two squares 590a-b with dashed line are used to schematically represent two connectors. The diagonal lines of each square represent the sliding rails on the connectors along which the jaws of the connectors can move. For each connector, a shaded area is used to represent one of its jaws. In this case, shaded area 595a represents one of the jaws of the connector shown by square 590a, and shaded area 595b represents one of the jaws of the connector shown by square 590b. The matched slopes of the jaw shape can guide and force the two engaging jaws to automatically align with each other. As shown in FIG. 5A, movement of jaw 595a towards jaw 595b or movement of jaw 595b towards jaw 595a or both along the longitude and/or latitude dimension (as indicated by the arrows) will force the two jaws 595a-b to automatically align with each other. Similarly, as shown in FIG. 5B, movement of jaw 595a towards jaw 595b or movement of jaw 595b towards jaw 595a or both along the separation dimension (as indicated by the arrows) will also force the two jaws 595a-b to automatically align with each other.

Figure 6A:
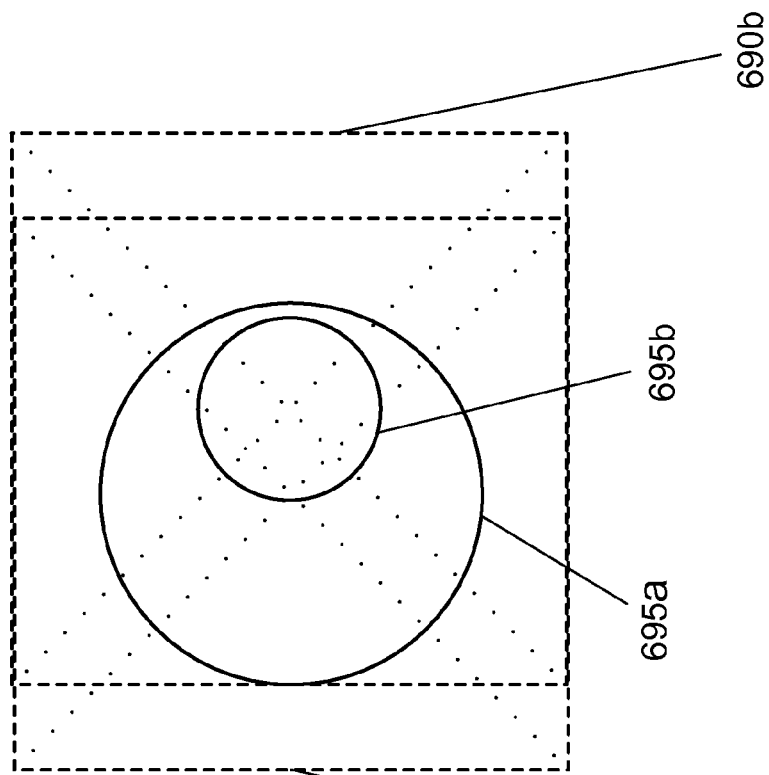
FIGS. 6A-6B show how the arrangement of connector jaws may contribute to the maximum and minimum compliance in longitude-latitude dimension.
Figure 6B:
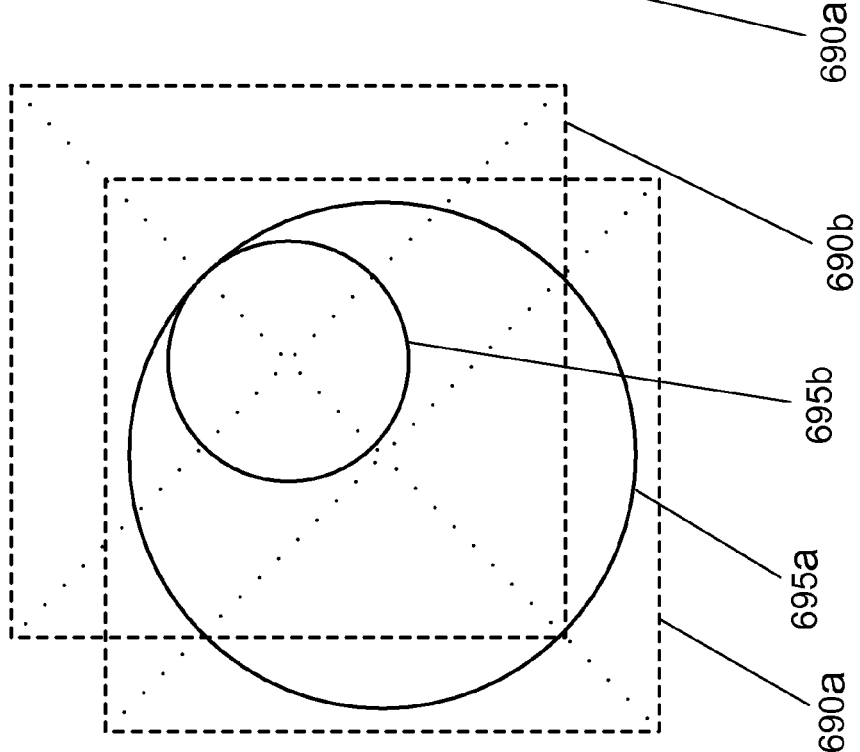

To illustrate how the arrangement of the connector jaws may contribute to the compliance, FIGS. 6A and 6B show the possible misalignment of two connectors in the longitude and latitude dimensions. Similar to FIGS. 5A and 5B, in FIGS. 6A and 6B two squares 690a-b with dashed line are also used to schematically represent the two connectors. The diagonal lines of each square also represent the sliding rails on the connectors along which the jaws of the connectors can move. The bigger circle 695a indicates that the four jaws of connector 690a are open, and the small circle 695b indicates that the four jaws of connector 690b are closed. FIG. 6A shows the compliance, (50–15)=35 mm, when the rails of two engaging connectors are aligned but the jaws are not. In this case, the closing of the outer jaws (the bigger circle 695a) will force the inner jaws (the small circle 695b) to the center. FIG. 6B shows the compliance when the rails and jaws are both misaligned. In this case, the outer jaws 695a will rely on their shape to force alignment of the inner jaws 695b. The max allowed misalignment is equal to the half width of the jaws. In this prototype, the half width of a jaw is 5.0 mm.

In the separation dimension, a misalignment means that the two connectors starting the engagement when they are not yet touching each other and there is still a gap space between them (see, e.g., FIG. 5B). In this case, the connectors must rely on the shape of the connector jaws to bring them closer. The maximal compliance in this case is equal to the height of the jaw, which is 6.0 mm in this prototype.

Figure 7:
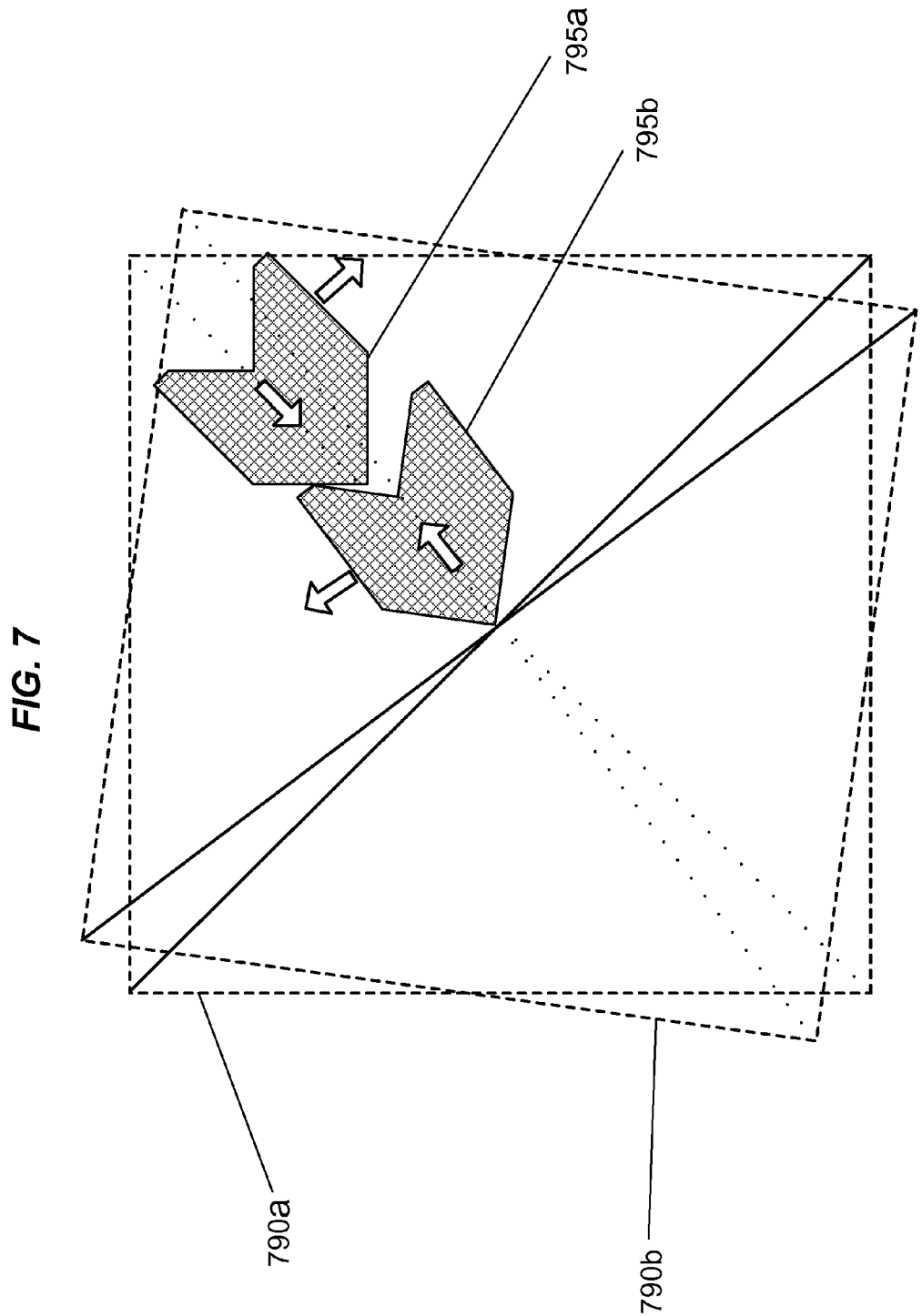
FIG. 7 shows compliance analysis in the roll dimension.

The compliance in the roll dimension is illustrated in the FIG. 7, where two connectors are aligned along the centerline, but with an error in the roll. Similar to FIGS. 5A-5B and 6A-6B, in FIG. 7 two squares 790a-b with dashed line are also used to schematically represent the two connectors. The diagonal lines of each square also represent the sliding rails on the connectors along which the jaws of the connectors can move. Also similar to FIGS. 5A and 5B, for each connector a shaded area is used to represent one of its jaws. In this case, shaded area 795a represents one of the jaws of the connector shown by square 790a, and shaded area 795b represents one of the jaws of the connector shown by square 790b. The maximal compliance in angle occurs when the inner connector jaws (i.e., the jaws for connector 790b including jaw 795b) are closed at the center. Using this prototype as an example, in this case, the angle is equal to $\tan^{-1}(5 \text{ mm}/12 \text{ mm}) = \sim 22°$, where 5 mm is the half width of the jaws, and the 12 mm is the length of a jaw. The minimal compliance of roll occurs when the outer jaws (i.e., the jaws for connector 790a including jaw 795b) are completely open. In that case, the allowed angle in the roll misalignment is $\tan^{-1}(5 \text{ mm}/50 \text{ mm}) = \sim 5.7°$.

Figure 8:
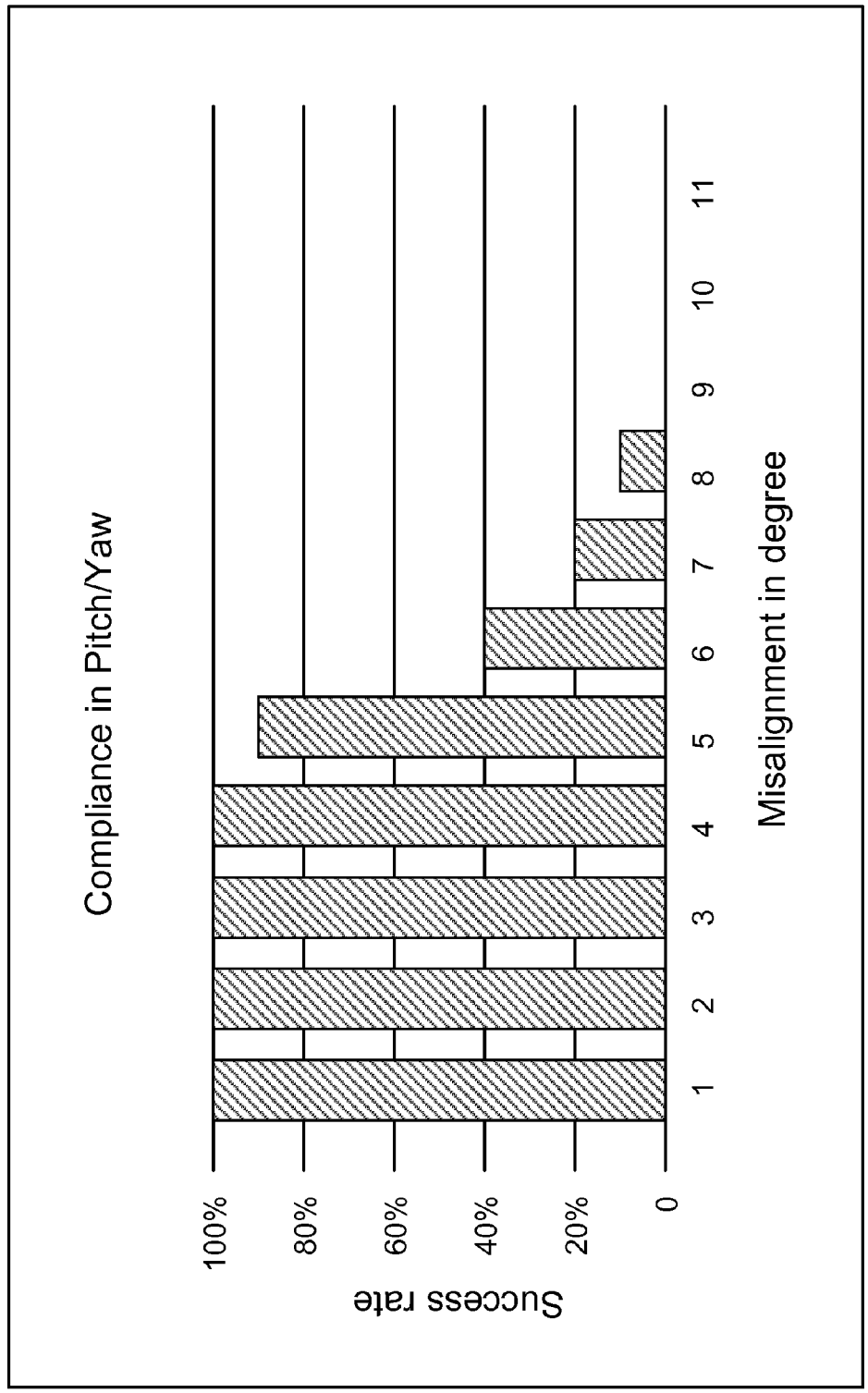
FIG. 8 shows compliance in pitch/yaw dimension.

To determine the compliance values in the pitch and yaw dimension, two connectors were manually placed together with a measured error in the angle alignment while allowing them to touch each other. The connectors were then turned on to let the jaws starting movement along the rails until they are successfully docked or fail to make an engagement. The introduced error in angle alignment is ranging from 0 degree to 10 degree. Ten experiments were performed for each introduced error and results are shown in FIG. 8. FIG. 8 indicates that the compliance in the pitch or yaw dimension is about 5 degrees.

Connectors designed based on the teachings of this document can be used to provide various beneficial features, including: (1) homogeneous or genderless structure so that any connector can join with any other connector, (2) single side operation so that one connector can connect or release itself even if the other party is not operational due to damage or malfunction, (3) thin and efficient profile so that it is mechanically strong and consumes zero energy when connected or disconnected, (4) small energy consumption during docking and zero energy consumption after connected or disconnected, (5) multi-orientation mode so that a connection can be made for every 90 degree, (6) self-alignment in both orientation and displacement during the connecting or engaging process, and (7) integration with sensors and controllers for autonomous operation and communication.

Connectors designed based on the teachings of this document can be used to connect robotic modules such as SuperBot with other types of special devices for multiple functionalities. This is to balance the homogeneous structure of self-reconfigurable modules with the required heterogeneous functions for various applications in the real world. There are two extremes. At one extreme, all modules have homogeneous functions with identical structures. At the other extreme, all modules are unique and special. The first extreme would be very wasteful with a great deal of redundancy and therefore inefficiency. The other extreme would be efficient but subject to single point failures. Our approach of using connectors designed based on the teachings of the present disclosure to allow homogeneous modules to host heterogeneous devices is a good balance between the two extremes. The heterogeneous devices connectable via such connectors to any robotic modules include special sensors, actuators, power suppliers, and tools, and can form systems that combine many functions in a coherent framework.

Examples of special devices may be designed and built to demonstrate this ability. One is a micro-thruster as an actuator to enable modules to fly in micro-gravity. The other is a tool/device to protect seed growing in extreme temperatures. The third kind can be a camera or vision device with long-distance communication that will allow the robot to see in its environment and remotely operated in complex environments.

In one implementation, four connectors as shown in FIGS. 1A-1D are constructed and integrated with a self-configurable SuperBot. With such connectors, SuperBot can demonstrate the desired capabilities for self-reconfiguration and self-healing.

Each connector is 64 mm in diameter and 14 mm thick. When the four connector jaws are completely open, the max distance between opposing jaws is 50 mm. When the jaws are closed at the center, the minimal distance across opposing jaws is 15 mm.

The connectors are designed such that they can be seamlessly integrated with existing SuperBot modules. The connector can be securely mounted on six different side of a SuperBot module (i.e., front, back, left, right, top, and bottom) for 3D reconfigurations. The parts of the connectors can be constructed by a high-precision fast prototyping SLA machine with a durable plastic-like material. The total weight of a complete connector made as such is about 50 g.

Each prototype connector is driven by a micro-motor and it is powered and controlled by the internal battery and microprocessor in the SuperBot module. During a docking process, each connector consumes about 40-65 mA for opening or closing the jaws to engage with another connector. Once the engagement is complete, the jaws of the two connectors are firmly bitten into a lock position, and the motor will stop and the connectors will stay engaged without consuming any energy (i.e., the motor consumes 0.0 mA).

While this document contains many specifics, these should not be construed as limitations on the scope of the invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only one implementation of a genderless single-end releasable reconfigurable connector is disclosed. Variations and enhancements of the described implementation and other implementations can be made based on what is described and illustrated in this document.

What is claimed is:

1. A reconfigurable connector, comprising:
   a base;
   a plurality of jaws disposed on the base and movable along a plurality of predetermined paths on the base respectively, wherein the plurality of jaws are capable of engaging or disengaging a plurality of jaws of another identical connector when the plurality of jaws of the reconfigurable connector move in either direction along the plurality of predetermined paths respectively; and
   an actuator attached to the base and configured to engage and move the plurality of jaws of the reconfigurable connector in synchronization to connect or disconnect the reconfigurable connector with the another identical connector.

2. The reconfigurable connector of claim 1, wherein the plurality of jaws of the reconfigurable connector comprise four jaws that are movably engaged in four linear sliding rails respectively so that each jaw can move along its respective sliding rail, wherein the four sliding rails are formed in a cross configuration to meet at a center location of the base.

3. The reconfigurable connector of claim 2, wherein the reconfigurable connector engages to the another identical connector when the four jaws move towards the center location.

4. The reconfigurable connector of claim 3, wherein the reconfigurable connector engages to the another identical connector when the fours four jaws move about halfway of the sliding rails.

5. The reconfigurable connector of claim 2, wherein the reconfigurable connector engages to the another identical connector when the four jaws move away from the center location.

6. The reconfigurable connector of claim 5, wherein the reconfigurable connector engages to the another identical connector when the four jaws move about halfway of the sliding rails.

7. The reconfigurable connector of claim 2, wherein the actuator comprises a motorized circular gear, the motorized circular gear comprising concentric gear tracks that are engaged to the four jaws.

8. The reconfigurable connector of claim 1, further comprising a device that communicates with the another identical connector to guide docking alignment between the reconfigurable connector and the another identical connector.

9. The reconfigurable connector of claim 8, wherein the device comprises a sensor configured to sense the position of the jaws of the another identical connector and the engagement between the jaws of the reconfigurable connector and the jaws of the another identical connector.

10. The reconfigurable connector of claim 1, wherein the plurality of jaws of the reconfigurable connector are shaped and arranged to automatically align the reconfigurable connector with the another identical connector during engagement in longitude, latitude, separation, pitch, yaw or roll dimension.

11. A reconfigurable connector, comprising:
a base;
a plurality of movable jaws disposed on the base and configured to engage or disengage a plurality of jaws of another connector to establish or break a connection between the reconfigurable connector and the another connector; and
an actuator attached to the base and configured to engage and drive the plurality of jaws of the reconfigurable connector to connect or disconnect the reconfigurable connector with the another connector;
wherein the reconfigurable connector is capable of establishing or breaking the connection regardless of whether the another connector is operational or whether the another connector has a female or male connector configuration.

12. The connector as in claim 11, wherein the base comprises linear rail tracks to which the plurality of jaws of the reconfigurable connector are moveably engaged and the linear rail tracks are in a cross configuration to meet at a center location of the base, and the actuator comprises a motorized circular gear comprising concentric gear tracks that are engaged to the plurality of jaws of the reconfigurable connector to drive the plurality of jaws of the reconfigurable connector to move along the linear rail tracks.

13. A robotic system, comprising:
a plurality of robotic modules; and
a plurality of reconfigurable connectors, each reconfigurable connector comprising:
a base structured to comprise a plurality of predetermined paths;
a plurality of jaws disposed on the base and movable along the plurality of predetermined paths on the base respectively, wherein the plurality of jaws are capable of engaging or disengaging a plurality of jaws of another identical connector when the plurality of jaws of the reconfigurable connector move in either direction along the plurality of predetermined paths respectively; and
an actuator attached to the base and configured to engage and move the plurality of jaws of the reconfigurable connector in synchronization to connect or disconnect the reconfigurable connector with the another identical connector;
wherein at least two of the plurality of robotic modules are connected by two of the plurality of reconfigurable connectors.

14. The system of claim 13, wherein the predetermined paths are linear rail tracks to which the plurality of jaws of the reconfigurable connector are moveably engaged and the linear rail tracks are in a cross configuration to meet at a center location of the base.

15. The system of claim 13, wherein the actuator comprises a motorized circular gear, the motorized circular gear comprising concentric gear tracks that are engaged to the plurality of jaws of the reconfigurable connector.

16. A device comprising:
a plurality of reconfigurable connectors, each reconfigurable connector comprising:
a base structured to comprise a plurality of predetermined paths;
a plurality of jaws disposed on the base and movable along the plurality of predetermined paths on the base respectively, wherein the plurality of jaws are capable of engaging or disengaging a plurality of jaws of another identical connector when the plurality of jaws of the reconfigurable connector move in either direction along the plurality of predetermined paths respectively; and
an actuator attached to the base and configured to engage and move the plurality of jaws of the reconfigurable connector in synchronization to connect or disconnect the reconfigurable connector with the another identical connector;
wherein the reconfigurable connectors are engaged to one another to form a chain.

17. The device of claim 16, wherein the predetermined paths are linear rail tracks to which the plurality of jaws of the reconfigurable connector are moveably engaged and the linear rail tracks are in a cross configuration to meet at a center location of the base.

18. The device of claim 16, wherein the actuator comprises a motorized circular gear, the motorized circular gear comprising concentric gear tracks that are engaged to the plurality of jaws of the reconfigurable connector.

* * * * *

UNITED STATES PATENT AND TRADEMARK OFFICE
CERTIFICATE OF CORRECTION

| | | |
|---|---|---|
| PATENT NO. | : 8,234,950 B1 | Page 1 of 1 |
| APPLICATION NO. | : 12/368292 | |
| DATED | : August 7, 2012 | |
| INVENTOR(S) | : Wei-Min Shen et al. | |

It is certified that error appears in the above-identified patent and that said Letters Patent is hereby corrected as shown below:

Claim 4 Line 2 at Column 11 Line 11: In Claim 4, before "four" delete "fours".

Signed and Sealed this
Twenty-third Day of October, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,234,950 B1 | Page 1 of 1 |
| APPLICATION NO. | : 12/368292 | |
| DATED | : August 7, 2012 | |
| INVENTOR(S) | : Shen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this
Eleventh Day of December, 2012

David J. Kappos
*Director of the United States Patent and Trademark Office*